(12) United States Patent
Patra et al.

(10) Patent No.: US 12,118,207 B2
(45) Date of Patent: Oct. 15, 2024

(54) VIRTUAL KEYBOARD INTERFACE INPUT MANAGEMENT

(71) Applicant: INTERNATIONAL BUSINESS MACHINES CORPORATION, Armonk, NY (US)

(72) Inventors: Suman Patra, Kolkata (IN); Melanie Dauber, Oceanside, NY (US); Zachary A. Silverstein, Georgetown, TX (US); Jennifer M. Hatfield, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/183,205

(22) Filed: Mar. 14, 2023

(65) Prior Publication Data

US 2024/0311000 A1    Sep. 19, 2024

(51) Int. Cl.
*G06F 3/04886* (2022.01)

(52) U.S. Cl.
CPC .............. *G06F 3/04886* (2013.01); *G06F 2203/04803* (2013.01)

(58) Field of Classification Search
CPC ................................................ G06F 3/04886
See application file for complete search history.

(56) References Cited

U.S. PATENT DOCUMENTS

| | | |
|---|---|---|
| 6,646,572 B1 | 11/2003 | Brand |
| 7,487,461 B2 | 2/2009 | Zhai |
| 10,126,942 B2 | 11/2018 | Marsden |
| 10,379,737 B2 | 8/2019 | Lemay |
| 11,327,646 B2 | 5/2022 | Tran |
| 2005/0259080 A1* | 11/2005 | Cole ............... G06F 3/04895 345/168 |
| 2007/0074131 A1 | 3/2007 | Assadollahi |
| 2013/0002562 A1* | 1/2013 | Leskela ............ G06F 3/0237 345/169 |

(Continued)

FOREIGN PATENT DOCUMENTS

EP    1700291 B1    8/2016

OTHER PUBLICATIONS

Disclosed Anonymously, "Cognitive Virtual Keyboard Analysis," An IP.com Prior Art Database Technical Disclosure, IP.com No. IPCOM000265584D, Apr. 27, 2021, 4 pages.

(Continued)

*Primary Examiner* — Thu V Huynh
(74) *Attorney, Agent, or Firm* — James L. Olsen

(57) ABSTRACT

Aspects of the present disclosure relate to virtual keyboard input management. An input can be received from a user on a virtual keyboard with multiple keyboard modes, the virtual keyboard having one or more controls for toggling between the multiple keyboard modes. A determination can be made whether a control for toggling between the multiple keyboard modes was unintentionally activated or unintentionally not activated by the user resulting in an unintentional input. An intended input can be determined in response to determining that the control for toggling between the multiple keyboard modes was unintentionally activated or unintentionally not activated by the user resulting in the unintentional input. The determined intended input can then be input instead of the unintentional input.

16 Claims, 8 Drawing Sheets

(56) References Cited

U.S. PATENT DOCUMENTS

| | | | |
|---|---|---|---|
| 2014/0068492 A1* | 3/2014 | Yu .................... | G06F 3/04886 |
| | | | 715/773 |
| 2015/0067490 A1* | 3/2015 | Carney ............... | G06F 40/166 |
| | | | 715/271 |
| 2016/0034046 A1* | 2/2016 | Waddell .............. | G06F 3/0237 |
| | | | 345/173 |
| 2016/0070467 A1* | 3/2016 | Hsu .................... | G06F 3/04886 |
| | | | 715/773 |
| 2017/0185287 A1* | 6/2017 | Unruh .................. | G06F 3/041 |
| 2020/0233500 A1* | 7/2020 | Mannby ............... | G06F 3/04886 |
| 2021/0405870 A1* | 12/2021 | Marsden ............... | G06F 3/016 |

OTHER PUBLICATIONS

Disclosed Anonymously, "Real-Time Cognitive Keyboard Input Switching During a Dialog in a Heterolingual Environment," An IP.com Prior Art Database Technical Disclosure, IP.com No. IPCOM000267349D, Oct. 19, 2021, 6 pages.

* cited by examiner

VIRTUAL KEYBOARD INTERFACE INPUT MANAGEMENT

BACKGROUND

The present disclosure relates generally to the field of computing, and in particular, to virtual keyboard interface input management.

Keyboard interfaces can be virtualized on device interface screens (e.g., touch screens), in virtual or augmented reality, and mid-air (e.g., via holography) such that users can select keys on the virtualized keyboard in a manner similar to a physical keyboard. In these virtual keyboard interfaces, there can be controls for toggling between different keyboard modes. For example, a first keyboard mode can include non-capital letters, a second keyboard mode can include capitalized letters, and a third keyboard mode can include numbers and/or symbols. However, it is common for users to unintentionally activate controls for toggling between different keyboard modes, which can result in unintentional inputs. Because the semantic distance between inputs submitted via different modes can be drastic, conventional artificial intelligence (AI) and spell-check algorithms may not properly correct unintentional inputs resulting from unintentional mode switching. Improvements are needed for managing virtual keyboard inputs, and in particular, to managing virtual keyboard inputs resulting from unintentional activation and/or inactivation of virtual keyboard mode switching controls.

SUMMARY

Aspects of the present disclosure relate to a computer program product, system, and method for virtual keyboard input management. An input can be received from a user on a virtual keyboard with multiple keyboard modes, the virtual keyboard having one or more controls for toggling between the multiple keyboard modes. A determination can be made whether a control for toggling between the multiple keyboard modes was unintentionally activated or unintentionally not activated by the user resulting in an unintentional input. An intended input can be determined in response to determining that the control for toggling between the multiple keyboard modes was unintentionally activated or unintentionally not activated by the user resulting in the unintentional input. The determined intended input can then be input instead of the unintentional input.

The above computer program product, system, and method for provide various improvements. Because virtual keyboards can include a plurality of modes and controls for toggling between the modes, it can be common for users to unintentionally activate these controls which results in unintentional inputs. Aspects of the present disclosure automatically correct unintentional inputs by replacing them with determined intentional inputs. This can enhance usability of virtual keyboards, reducing the amount of unintentional (incorrect) inputs that are submitted therefrom.

In embodiments, determining that the control for toggling between the multiple keyboard modes was unintentionally activated includes determining an input location on the control and determining that the input location was received on an unintentional area of the control. This can allow more accurate identification of unintentional activation of keyboard controls for toggling between keyboard modes.

In embodiments, determining that the control for toggling between the multiple keyboard modes was unintentionally activated includes analyzing input substance of inputs surrounding the unintentional input. This can aid in determining that the control for toggling between multiple keyboard modes was unintentionally activated, as inputs nearby the unintentional input may not be logically/contextually consistent with the unintentional input. This can allow more accurate identification of unintentional activation of keyboard controls for toggling between keyboard modes.

In embodiments, determining that the control for toggling between the multiple keyboard modes was unintentionally not activated includes determining an input location nearby the control and determining that the input location was received on an intentional area outside of the control. This can allow more accurate identification of unintentional inactivation of keyboard controls for toggling between keyboard modes.

In embodiments, determining that the control for toggling between the multiple keyboard modes was unintentionally not activated includes analyzing input substance of inputs surrounding the unintentional input. This can aid in determining that the control for toggling between multiple keyboard modes was unintentionally not activated, as inputs nearby the unintentional input may not be logically/contextually consistent with the unintentional input. This can allow more accurate identification of unintentional inactivation of keyboard controls for toggling between keyboard modes.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
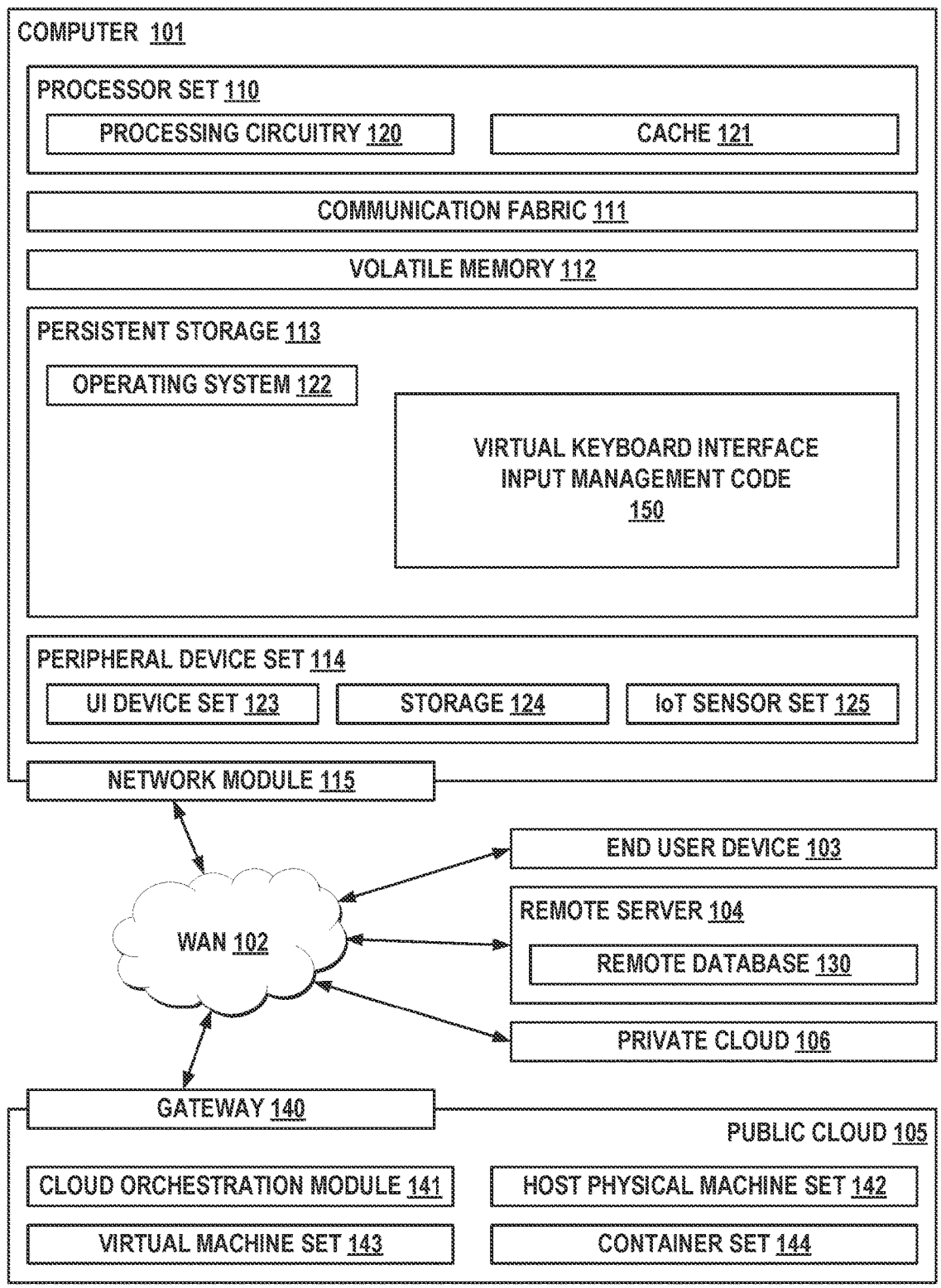
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to virtual keyboard interface input management. While the present disclosure is not necessarily limited to such applications, various aspects of the disclosure may be appreciated through a discussion of various examples using this context.

As stated previously, keyboard interfaces can be virtualized on device interface screens (e.g., touch screens), in virtual or augmented reality, and mid-air (e.g., via holography) such that users can select keys on the virtualized keyboard in a manner similar to a physical keyboard. In these virtual keyboard interfaces, there can be controls for toggling between different keyboard modes. For example, a first keyboard mode can include non-capital letters, a second keyboard mode can include capitalized letters, and a third keyboard mode can include numbers and/or symbols. However, it is common for users to unintentionally activate controls for toggling between different keyboard modes, which can result in unintentional inputs. Because the semantic distance between inputs submitted via different modes can be drastic, conventional artificial intelligence (AI) and spell-check algorithms may not properly correct unintentional inputs resulting from unintentional mode switching. Improvements are needed for managing virtual keyboard inputs, and in particular, to managing virtual keyboard inputs resulting from unintentional activation and/or unintentional inactivation of virtual keyboard mode switching controls.

Aspects of the present disclosure relate to virtual keyboard input management. An input can be received from a user on a virtual keyboard with multiple keyboard modes, the virtual keyboard having one or more controls for toggling between the multiple keyboard modes. A determination can be made whether a control for toggling between the multiple keyboard modes was unintentionally activated or unintentionally not activated by the user resulting in an unintentional input. An intended input can be determined in response to determining that the control for toggling between the multiple keyboard modes was unintentionally activated or unintentionally not activated by the user resulting in an unintentional input. The determined intended input can then be input instead of the unintentional input.

Aspects of the present disclosure provide various improvements. Because virtual keyboards can include a plurality of modes and/or controls for toggling between the modes, it can be common for users to unintentionally activate these controls which results in unintentional inputs. Aspects of the present disclosure automatically correct unintentional inputs by replacing them with determined intentional inputs based on various analyses. The analysis can include both input location and input substance analysis, which can improve the accuracy that an unintentional input is properly corrected. This can enhance usability of virtual keyboards, reducing the amount of unintentional (incorrect) inputs that are submitted therefrom.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as virtual keyboard interface input management code 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and virtual keyboard interface input management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in virtual keyboard interface input management code 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in virtual keyboard interface input management code 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
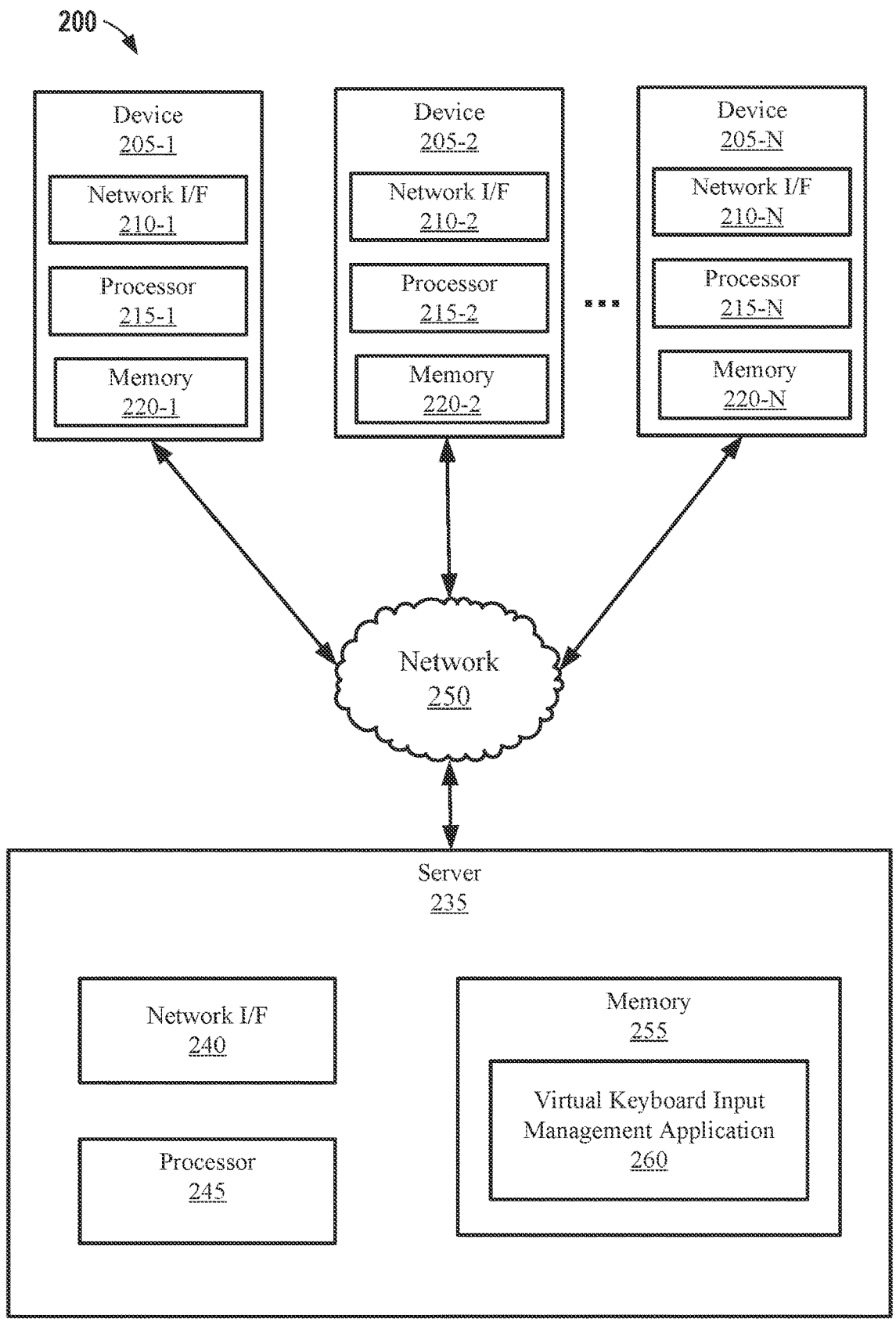
FIG. 2 is a block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2 . . . 205-N (collectively devices 205), at least one server 235, and a network 250.

The devices 205 and the server 235 include one or more processors 215-1, 215-2, 215-N (collectively processors 215) and 245 and one or more memories 220-1, 220-2, . . . , 220-N (collectively memories 220) and 255, respectively. The processors 215 and 245 can be same as, or substantially similar to, processor set 110 of FIG. 1. The memories 220 and 255 can be the same as, or substantially similar to, volatile memory 112 and/or persistent storage 113 of FIG. 1.

The devices 205 and the server 235 can be configured to communicate with each other through internal or external network interfaces 210-1, 210-2 . . . 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, augmented reality/virtual reality (AR/VR) software, etc.). For example, devices 205 and/or server 235 can include components/devices such as those described with respect to peripheral device set 114 of FIG. 1. The devices 205 and/or the server 235 can be servers, desktops, laptops, or handheld devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a virtual keyboard input management application (VKIMA) 260. The VKIMA 260 can be configured to perform various functions for virtual keyboard input management. In particular, the VKIMA 260 can be configured to manage inputs to virtual keyboards including multiple keyboard modes (e.g., selections) and controls (e.g., toggles) for switching between keyboard modes.

Figure 4:
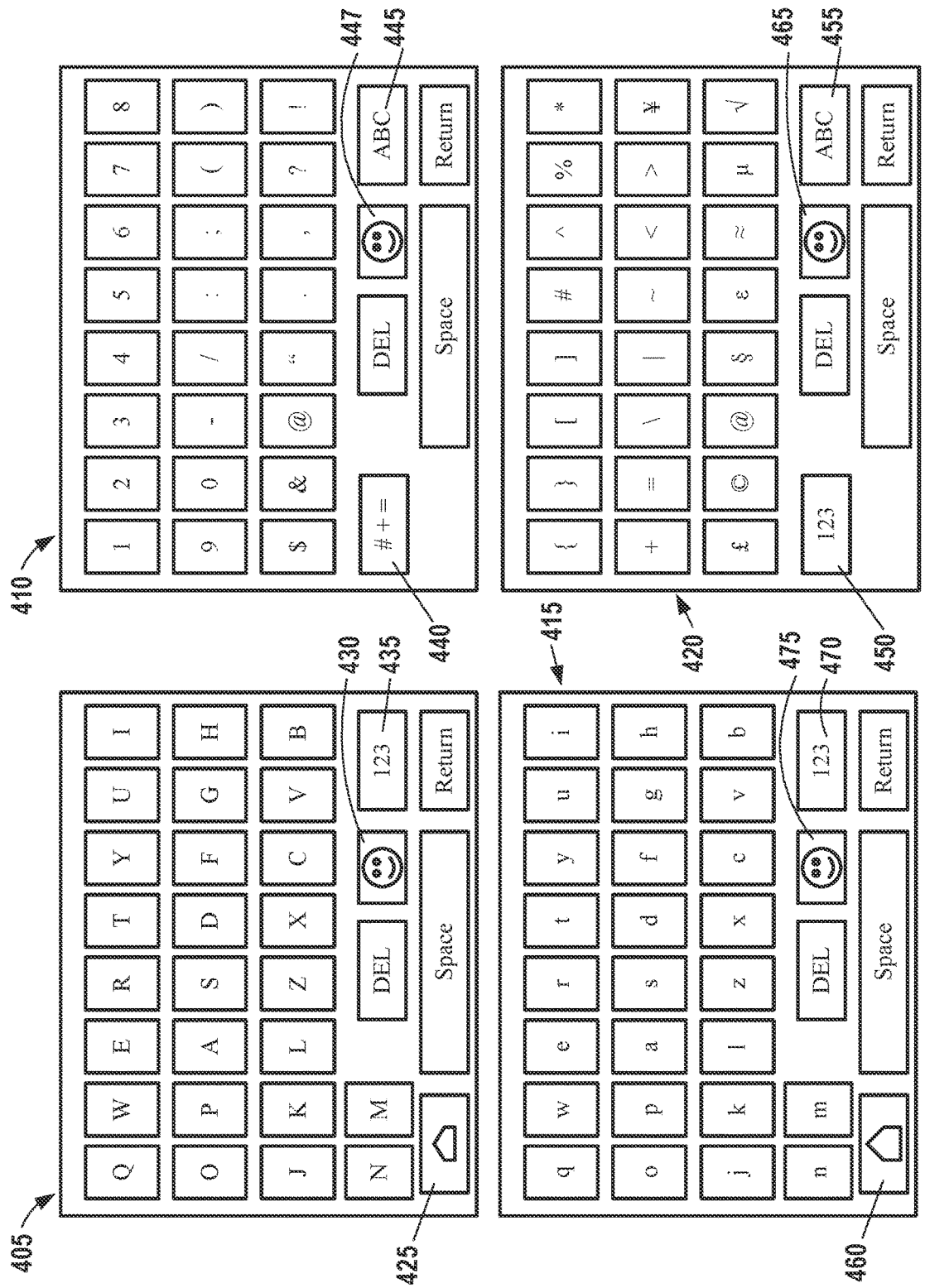
FIG. 4 is a diagram illustrating various keyboard modes of a virtual keyboard, in accordance with embodiments of the present disclosure.

The VKIMA 260 can be configured to receive inputs submitted on a virtual keyboard (e.g., virtual keyboards of devices 205) having multiple keyboard modes. Any suitable inputs can be received on the virtual keyboard, including alphanumeric characters, symbols, and emojis. In embodiments, the virtual keyboard can be displayed on a touch screen or in an augmented reality (AR) or virtual reality (VR) environment. The virtual keyboard can have any suitable number of keyboard modes. FIG. 4 depicts example keyboard modes that may be implemented on a virtual keyboard.

The VKIMA 260 can be configured to determine whether a control for toggling between the multiple keyboard modes was unintentionally activated leading to an unintentional input. In embodiments, determining that the control for toggling between multiple keyboard modes was unintentionally activated includes analyzing locations of input interactions submitted to the virtual keyboard. If any input interactions were submitted in a predetermined location designated as unintentional (e.g., an edge of the toggle control, a corner of the toggle control, a certain area of the toggle control, etc.), then a determination can be made that the control for toggling between multiple keyboard modes was unintentionally activated. In embodiments, determining that the control for toggling between multiple keyboard modes was unintentionally activated can include analyzing the substance of inputs submitted on the virtual keyboard. The analysis can consider whether the inputs are contextually/logically consistent with other nearby inputs (e.g., based on semantic similarity). In these embodiments, in response to identifying a context/logic mismatch, (e.g., the text before and/or after not being contextually or logically related to the input), such as a low semantic similarity, a determination can be made that the toggle control was unintentionally activated. In embodiments, determining whether the toggle control was unintentionally activated can collectively consider both the location of touch interactions and the context surrounding the inputs (i.e., the substance of inputs) that were submitted after a keyboard mode shift.

Upon determining that the control for toggling between multiple keyboard modes was unintentionally activated, an intended input can be determined. The intended input can be determined based on a mapping between keys of the incorrect (e.g., unintended) keyboard mode and the correct (e.g., intended) keyboard mode. For example, any keys which were activated on the incorrect keyboard mode resulting in the unintentional input can be mapped to keys on the correct keyboard mode that were intended to be input. Thus, a 1-to-1 mapping between locations of the unintentionally inputted keys and the locations of the intended keys can be determined such that the intended input can be ascertained. In embodiments, the correct keyboard selection can be assumed to be the keyboard mode that was activated before the control for toggling was unintentionally activated, leading to a keyboard shift (i.e., a keyboard mode change). In embodiments where the keyboard layout differs based on the mode (e.g., the position of keys on each keyboard mode vary), input location data (e.g., touch coordinates or cursor input coordinates) can be referenced to determine mapping keys. For example, a location where a user provided an input on a first keyboard mode can be determined and used to determine a key corresponding to the input location on a second keyboard mode.

In embodiments, determining whether the control was unintentionally activated can also consider the input that would be submitted if the control for toggling between keyboards modes was not activated. That is, if the input on the keyboard selection prior to the keyboard shift has a greater logical/contextual consistency (e.g., a higher semantic similarity) between surrounding inputs than the input on the keyboard mode after the keyboard shift, then a determination can be made that the control for toggling was unintentionally activated. Thus, determining whether a toggle control was unintentionally activated can consider the location of the input interaction, the contextual/logical consistency of the input with respect to nearby inputs, and/or the consistence of inputs on the keyboard mode prior to the keyboard shift compared to the consistence of inputs on the keyboard mode after the keyboard shift.

Upon determining the intended input, the VKIMA 260 can be configured to input the intended input instead of the unintentional input. This can include replacing the unintended input with the intended input in an input field. In embodiments, the intended input can then be electronically transmitted or stored (e.g., saved within a file).

Though reference is made to determining whether a control for toggling between multiple keyboard modes was unintentionally activated leading to an unintentional input, in embodiments, aspects of the present disclosure can also determine whether a control for toggling between multiple keyboard modes was unintentionally not activated leading to an unintentional input using the same or substantially similar methodologies. For example, analyzing input location and/or input substance can be used for determining whether a keyboard mode shift occurred when it should not have and when a keyboard mode shift did not occur when it should have. Thus, aspects of the present disclosure can provide input corrections in both instances (e.g., when a control for toggling between keyboard modes was unintentionally activated and when a control for toggling between keyboard modes was unintentionally not activated), to be discussed further with respect to FIG. 3.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., historical virtual keyboard input data), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
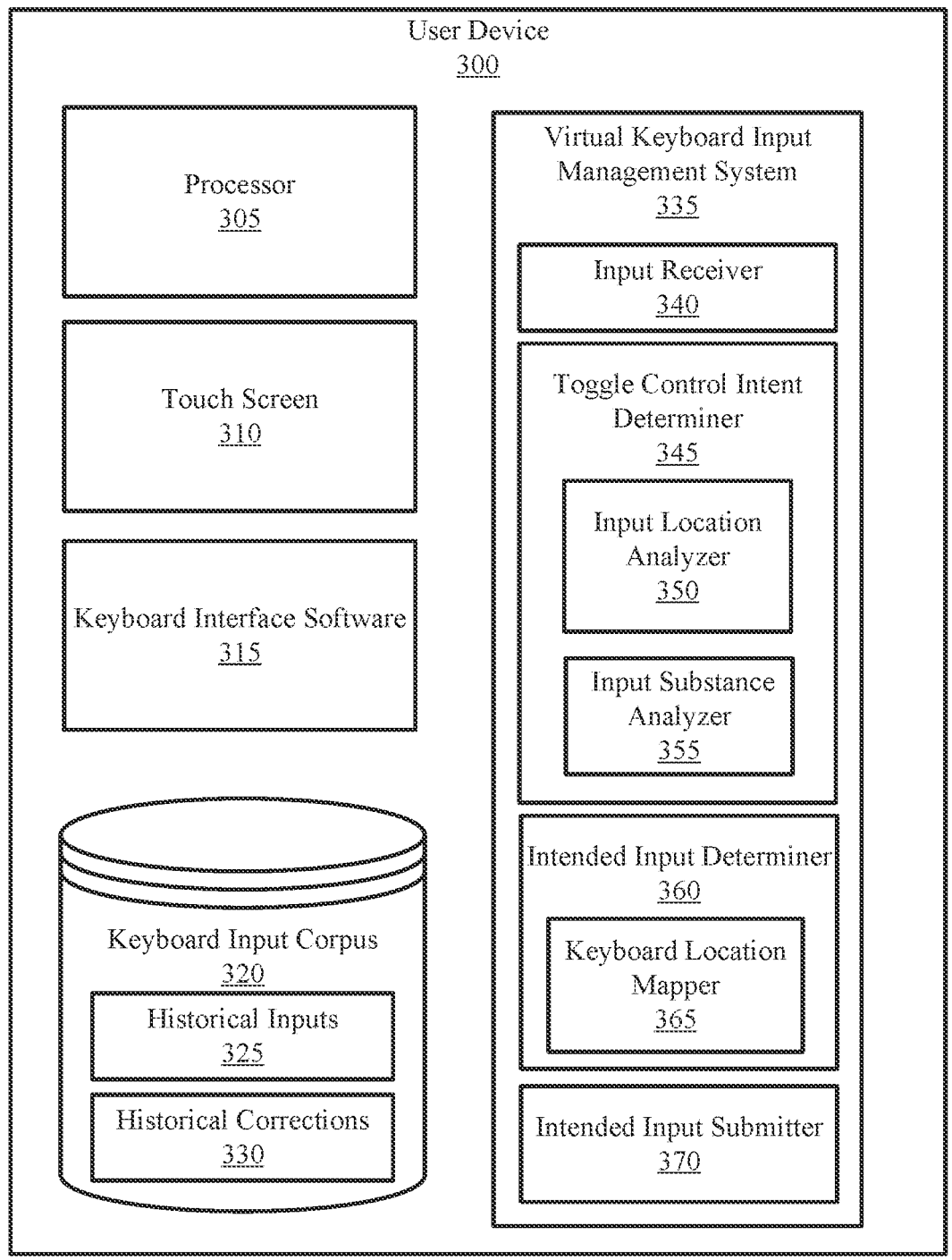
FIG. 3 is a block diagram illustrating an example user device implementing a virtual keyboard input management system, in accordance with embodiments of the present disclosure.

Referring now to FIG. 3, shown is a block diagram illustrating an example user device 300, in accordance with aspects of the present disclosure. The user device 300 includes a processor 305, a touch screen 310, and keyboard interface software 315. In embodiments, the user device 300 can be the same as, or substantially similar to, computer 101 of FIG. 1. The processor can be the same as, or substantially similar to, processor set 110 of FIG. 1. Though various components and/or functions are shown as included within device 300, in embodiments, the various components and/or functions can be located in another device or system and remotely accessible.

The touch screen 310 can be configured to receive input interactions. The input interactions can be received on a virtual keyboard (not shown), which can be provided via display by keyboard interface software 315. Any suitable touch screen 310 technology can be implemented without departing from the spirit and scope of the present disclosure. In embodiments, a touch screen 310 may not be implemented, as the keyboard interface software 315 can be provided via mixed reality (MR) (augmented reality (AR) and/or virtual reality (VR)), a device screen having capabilities for input selection via a mouse or other input mechanism, or on a holographic keyboard (e.g., a keyboard projected via a hologram mid-air with corresponding input functionality). In these embodiments, inputs on the virtual keyboard can occur in mixed reality, on a screen having capabilities for input interaction (e.g., using cursor based input methods), or on a holographic keyboard. In embodiments, input receiver 340 can be configured to receive an input location associated with an input. The input location can be positional coordinates (e.g., X, Y coordinates) on a touch screen or on a virtual keyboard.

The user device 300 includes a virtual keyboard input management system (VKIMS) 335. The VKIMS 335 can include functionalities discussed with respect to the VKIMA 260 of FIG. 2. The VKIMS 335 includes an input receiver 340, a toggle control intent determiner 345, an intended input determiner 360, and an intended input submitter 370. The functionalities of the input receiver 340, toggle control intent determiner 345, intended input determiner 360, and intended input submitter 370 can be processor-executable instructions that can be executed by a dedicated or shared processor using received inputs.

The input receiver 340 can be configured to receive inputs submitted on a virtual keyboard (e.g., provided via keyboard interface software 315). Keyboard inputs can include any inputs that are input into a virtual keyboard, regardless of whether they are transmitted via a communication medium (e.g., via a text message, via an email, via an intent messaging application, etc.) or saved (e.g., within a file). In embodiments, the input receiver 340 can be configured to record any received inputs within historical inputs 325 of a keyboard input corpus 320. The keyboard input corpus 320 can include past historical inputs 325 and historical corrections 330 for keyboard inputs of users. In embodiments, the keyboard input corpus 320 can have multiple entries corresponding to multiple users. That is, a first user can have a first set of historical inputs and historical corrections, a second user can have a second set of historical inputs and historical corrections, etc. stored within keyboard input corpus 320. In embodiments, the keyboard input corpus 320 can aid in decision making regarding whether controls for toggling between keyboard modes were intentionally activated and/or for determining intended inputs to be submitted. That is, historical inputs 325 and historical corrections 330 can be referenced when determining whether a control for toggling between keyboard modes is intentionally activated and/or for determining an intended input.

The toggle control intent determiner 345 can be configured to determine whether a control for toggling between keyboard modes was unintentionally activated (or for determining whether the control for toggling between keyboards modes was unintentionally not activated). Determining whether the control for toggling between keyboard modes was unintentionally activated (or unintentionally not activated) can be completed in various manners. The toggle control intent determiner 345 includes an input location analyzer 350 and an input substance analyzer 355, both of which can aid in determining whether the control for toggling between keyboard modes was unintentionally activated (or unintentionally not activated).

In embodiments, the toggle control intent determiner 345 can be configured to determine whether a control for toggling between multiple keyboard selections was unintentionally activated (or unintentionally not activated) based on input location. Virtual keyboards can include functionality for indicating, on a fine granularity, locations (e.g., coordinates) where a key is interacted with (e.g., touched or selected with a cursor), which can depend on the specific input technology of the virtual keyboard (e.g., the amount of touch sensors in a touch screen, the area of a virtual keyboard displayed in mixed reality or on a hologram, etc.). The input location analyzer 350 can be configured to collect and analyze input locations on the virtual keyboard to aid in determining whether a control for toggling between multiple keyboard modes was unintentionally activated or unintentionally not activated.

In embodiments, areas on the control for toggling between keyboard modes on the virtual keyboard can be designated as "unintentional areas." In some embodiments, in response to determining that an unintentional area on the virtual keyboard was activated by a user, the input location analyzer 350 can be configured to determine that the control for toggling between keyboard modes was unintentionally activated. However, in some embodiments, in response to determining that a user provided an input in an unintentional area, the corresponding input can be flagged as potentially unintentional. This can be completed such that further consideration of additional data can be analyzed in addition to the location input data, such as data analyzed by input substance analyzer 355.

Figure 5:
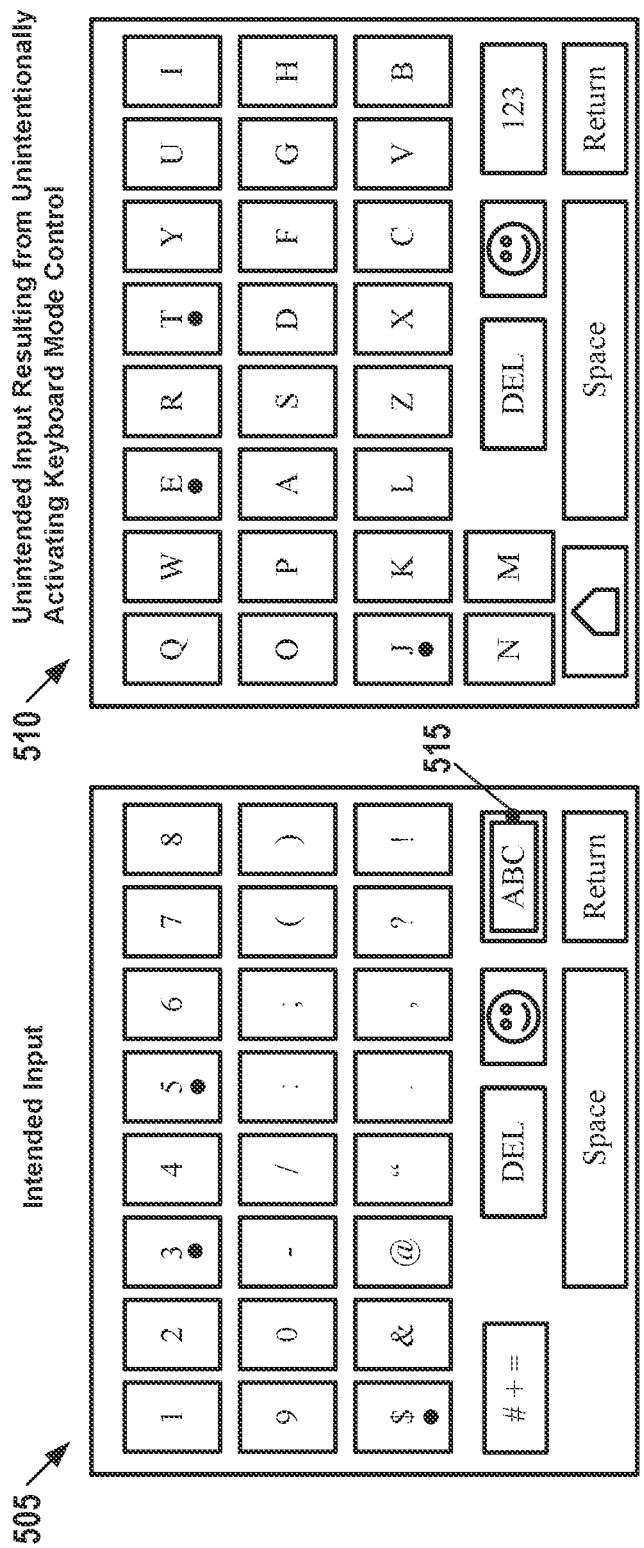
FIG. 5 is a diagram illustrating correction of an unintended input that was input as a result of an unintentional activation of a control for toggling between keyboard modes, in accordance with embodiments of the present disclosure.

Any suitable area on the virtual keyboard can be designated as an unintentional area. For example, in some embodiments, a perimeter area within the control for toggling between keyboard modes can be designated as an unintentional area. In some embodiments, corners, edges, or other areas of the control for toggling between keyboard modes can be designated as unintentional areas. However, any suitable area on the control for toggling between keyboard modes can be designated as unintentional and used for the purpose of determining whether the control for toggling between keyboard modes was unintentionally activated. FIG. 5 depicts an example of a control for toggling between keyboard modes being interacted with at an unintentional area 515 leading to an unintentional input.

As such, aspects recognize that a control for toggling between multiple keyboard modes on a virtual keyboard can have one or more defined unintentional areas. In response to receiving a touch action within an unintentional area, a determination can be made that the control for toggling between keyboard modes was unintentionally activated or potentially unintentionally activated. In embodiments where the unintentional areas designate potentially unintentional activation, additional data can be considered for determining whether the touch action was intentional or not, such as contextually relevant nearby input data analyzed by input substance analyzer 355, to be discussed further below.

In embodiments, areas around (outside of) the control for toggling between keyboard modes on the virtual keyboard can be designated as "intentional." These areas may be interacted with by a user, but may not actually lead to a keyboard mode switch, as they are outside of the control for toggling between keyboard modes. As such, intentional areas on the virtual keyboard can be used for determining whether a control for toggling between keyboard modes was unintentionally not activated. In some embodiments, in response to determining that an intentional area on the virtual keyboard was interacted with by a user, the input location analyzer 350 can be configured to determine that the control for toggling between keyboard modes was unintentionally not activated. However, in some embodiments, in response to determining that a user provided an input in an intentional area, the corresponding input can be flagged as potentially intentional. Hence, determining whether such input means control for toggling was unintentionally not activated can involve further consideration of additional data, such as data analyzed by input substance analyzer 355.

Figure 6:
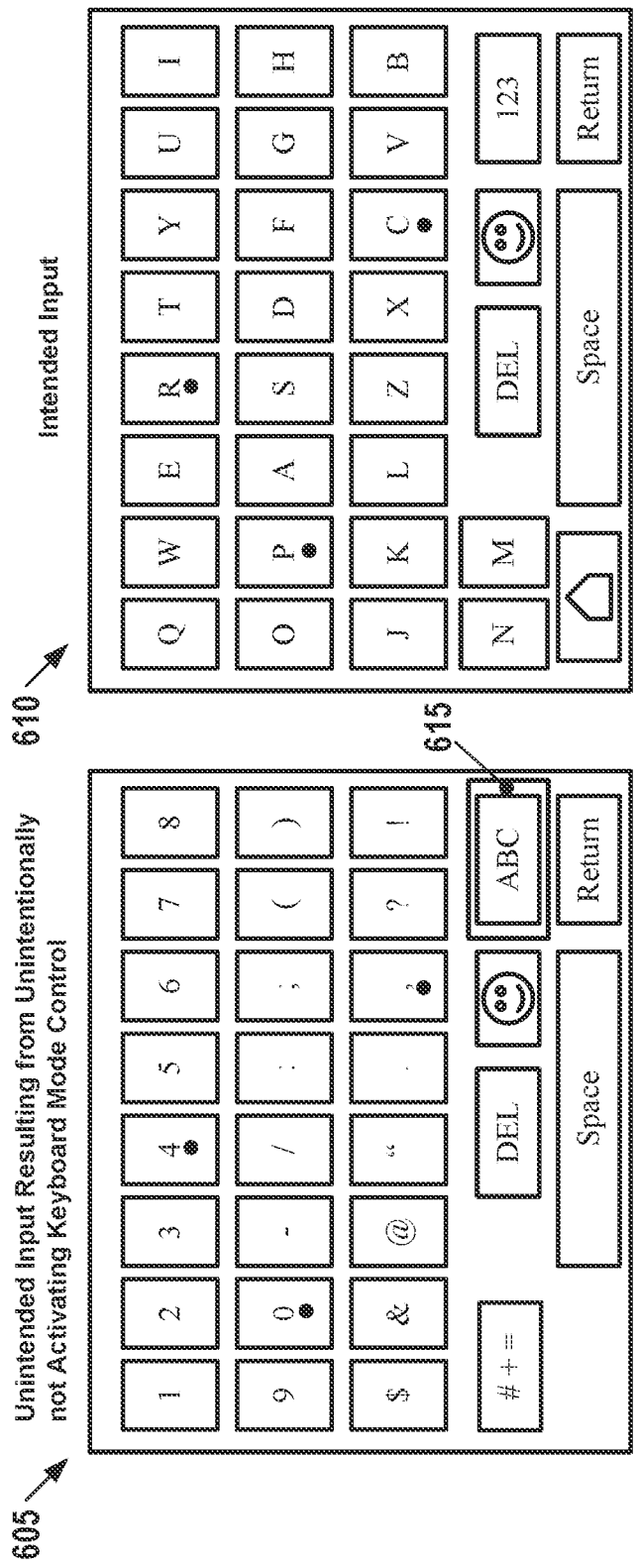
FIG. 6 is a diagram illustrating correction of an unintended input that was input as a result of an unintentional inactivation of a control for toggling between keyboard modes, in accordance with embodiments of the present disclosure.

Any suitable area on the virtual keyboard can be designated as an intentional area. For example, in some embodiments, a perimeter area outside of the control for toggling between keyboard modes can be designated as an intentional area. However, any suitable area outside of the control for toggling between keyboard modes can be designated as intentional and used for the purpose of determining whether the control for toggling between keyboard modes was intentionally not activated. FIG. 6 depicts an example of a control for toggling between multiple keyboard modes being interacted with at an intentional area 615 (e.g., a perimeter around the control for toggling modes) leading to an unintentional input.

As such, areas outside of (e.g., encompassing) a control for toggling between multiple keyboard modes on a virtual keyboard can be designated as intentional areas. Thus, in response to receiving a touch action within a designated intentional area, a determination can be made that the control for toggling between keyboard modes was unintentionally not activated or potentially unintentionally not activated. In embodiments where the intentional areas designate potentially unintentional inactivation, additional data can be considered for determining whether the touch action was intentional or not, to be discussed further below.

In some embodiments, the toggle control intent determiner 345 can be configured to determine whether a control for toggling between keyboard modes was unintentionally activated based on input data analyzed by input substance analyzer 355. Because inputs following an unintentional activation of a control for toggling between keyboard modes would likely not be contextually and/or logically consistent with surrounding text inputted using a correct (e.g., intentional) keyboard mode, analysis of the text surrounding the inputs associated with the keyboard mode switch can provide insights regarding whether the control for toggling between keyboard modes was unintentionally activated. In some embodiments, natural language processing (NLP) techniques can be utilized to quantify whether an input following a keyboard mode switch is logically and/or contextually consistent with surrounding text. For example, semantic similarity techniques can be used to compute a semantic distance between inputs associated with the keyboard mode switch and inputs not associated with the keyboard mode switch within a particular proximity (e.g., a number of words or sentences before and/or after the inputs associated with the keyboard mode switch) of the inputs associated with the keyboard mode switch. In these embodiments, if the semantic similarity does not satisfy a threshold (e.g., falls below a required semantic similarity or distance threshold), then a determination can be made that the control for toggling between keyboard modes was unintentionally activated. In some embodiments, analyzing nearby text (e.g., via semantic similarity analysis) may only be completed in response to determining that an unintentional area of the virtual keyboard was activated (e.g., determined by input location analyzer 350).

In embodiments, the toggle control intent determiner 345 can be configured to determine whether a control for toggling between keyboard modes was unintentionally not activated based on input data analyzed by input substance analyzer 355. Because inputs following an unintentional inactivation of a control for toggling between keyboard modes would likely not be contextually and/or logically consistent with surrounding text inputted using a correct (e.g., intentional) keyboard mode, analysis of the text surrounding the inputs can provide insights regarding whether the control for toggling between keyboard modes was unintentionally not activated. In embodiments, analysis by the input substance analyzer 355 can be triggered in response to determining that an intentional area was activated (e.g., an area outside of the control for toggling between keyboard modes that the user may have intended to activate). Upon determining that a potential unintentional inactivation of a control for toggling between keyboard modes (e.g., based on input location analysis) occurs, natural language processing (NLP) techniques can be utilized to quantify whether an input (e.g., associated with the unintentional inactivation) is logically and/or contextually consistent with surrounding text. For example, semantic similarity techniques can be used to compute a semantic distance between inputs associated with the unintentional inactivation of the control for toggling and inputs not associated with the unintentional inactivation within a particular proximity. In these embodiments, if the semantic similarity does not satisfy a threshold (e.g., falls below a required semantic similarity or distance threshold), then a determination can be made that the control for toggling between keyboard modes was unintentionally not activated. In some embodiments, analyzing nearby text (e.g., via semantic similarity analysis) may only be completed in response to determining that an intentional area of the virtual keyboard was activated (e.g., determined by input location analyzer 350).

Any suitable natural language processing techniques can be used to analyze inputs associated with unintentionally activated or unintentionally inactivated controls for toggling between keyboard modes with respect to nearby inputs. Various semantic similarity techniques can be implemented including, among others, latent semantic analysis (LSA), pointwise mutual information (PMI), generalized latent semantic analysis (GLSA), normalized google distance (NGD), twitter semantic similarity (TSS), normalized compression distance (NCD), explicit semantic analysis (ESA), salient semantic analysis (SSA), vector generation of explicitly-defined multidimensional semantic space (VGEM), Simrank, and NASARI. Aspects may also use other NLP techniques as opposed to, or in combination with, semantic similarity techniques, such as terminology extraction, word2vec, term frequency-inverse document frequency (tf-idf), componential analysis, tokenization, syntactic analysis, morphological segmentation, part of speech (POS) tagging, stemming, sentence breaking, parsing, lexical semantics, and relationship semantics, among others.

The intended input determiner 360 can be configured to determine an intended input that should be input instead of the input associated with the unintentional keyboard mode switch. A keyboard location mapper 365 can be configured to determine input characters of the correct keyboard to replace the input characters of the incorrect keyboard that was unintentionally activated. In embodiments where the location on the virtual keyboard of the keys match other keys on the virtual keyboard (e.g., the keyboard layouts are substantially similar), a key on the correct keyboard having the same location of the key on the incorrect keyboard can be selected as an intended input. In embodiments where the keyboards do not cleanly map (e.g., the keyboard layouts are different), the input location coordinates can be utilized to find a mapping key based on the input location. In embodiments, the intended input determiner 360 can also be configured to determine intended inputs where a keyboard mode switch did not occur because the control for toggling was unintentionally not activated. This can similarly be completed based on input location, as above. For example, inputs submitted on an incorrect keyboard unintentionally not switched to a correct keyboard can be mapped to the correct keyboard such that the intended input can be determined.

In embodiments, the toggle control intent determiner 345 can utilize the keyboard location mapper 365 to determine whether the control for toggling between keyboard modes was unintentionally activated or unintentionally not activated. For example, the input substance analyzer 355 can be configured to compute semantic similarity of the intended input with respect to surrounding text and compare this metric to the semantic similarity of the unintended input with respect to the surrounding text. In instances where the semantic similarity is greater for the intended input, a determination can be made that the control for toggling between keyboard modes was unintentionally activated (or unintentionally not activated).

The intended input submitter 370 can then receive the intended input determined by the intended input determiner 360 and provide the intended input instead of the unintended input (e.g., resulting from unintentional activation or inactivation of a control for toggling between keyboard modes). The intended input can be provided in any suitable location, such as in a text input field (e.g., of an instant messaging application), a text document, an email, a script, or any other suitable input location configured to receive alphanumeric, symbolic, and/or emoji-based inputs.

Referring now to FIG. 4, shown are example keyboard modes that can be included on a virtual keyboard, in accordance with embodiments of the present disclosure. A first keyboard mode 405 (all-caps), includes letters in a capitalized format. A second keyboard mode 410 includes numbers and symbols. A third keyboard mode 415 includes lower-case letters. A fourth keyboard mode 420 includes additional symbols. Each keyboard mode includes various controls for toggling between keyboard modes (mode switching). For example, the first keyboard mode 405 includes a shift-down control 425 for switching to the third keyboard mode 415 (lower-case letters), an emoji control 430 for switching to an emoji keyboard (not shown), and a numeric control 435 for switching to the second keyboard mode 410. The second keyboard mode 410 includes a symbol control 440 for switching to the fourth keyboard mode 420, an emoji control 447 for switching to an emoji keyboard (not shown), and an all-caps control 445 for switching to the first keyboard mode 405. The third keyboard mode 415 includes a shift-up control 460 for shifting to the first keyboard mode 405, an emoji control 475 for switching to an emoji keyboard (not shown), and a numeric control 470 for switching to the second keyboard mode 410. The fourth keyboard includes a numeric control 450 for switching to the second keyboard mode 410, an emoji control for switching to an emoji keyboard (not shown), and an all-caps control 455 for switching to the first keyboard mode 405.

Thus, virtual keyboards may have various keyboard modes and controls for switching between the keyboard modes. As such, users may enter unintended inputs as a result of unintentionally activating, or unintentionally not activating, such keyboard controls. Aspects of the present disclosure correct unintentional inputs as a result of unintentionally activating, or unintentionally not activating, controls for switching keyboard modes.

Referring now to FIG. 5, shown is an example diagram depicting an unintentional input that occurred as a result of a user unintentionally activating a control for keyboard switching, in accordance with embodiments of the present disclosure. As depicted in FIG. 5, a user may intend to input the phrase, "It costs $53." In doing so, after finishing inputting the word "costs," the user may have attempted to switch modes to a numeric keyboard 505, shown above. However, upon attempting to begin inputting "$53," the user unintentionally activated the "ABC" control for toggling to an all-caps keyboard mode 510. As shown in FIG. 5, the user may have entered an input on an unintentional area 515 on the "ABC" all-caps control. As such, rather than inputting "It costs $53," the user input "It costs JTE."

Aspects of the present disclosure can automatically correct this issue by analyzing the location of the input interaction on the "ABC" all-caps control. Based on the analysis (e.g., completed by input location analyzer 350), a determination can be made that an unintentional area of the "ABC" all-caps control was activated. Thereafter, the context of the surrounding inputs, "It costs," can be analyzed (e.g., by the input substance analyzer 355) with respect to the input that was entered as a result of the unintentional control activation, "JTE." In this instance, the input substance analyzer 355 can determine a low semantic similarity between "It costs" and "JTE" (e.g., a semantic similarity or distance below a threshold). Thus, aspects of the present disclosure can determine that the "ABC" all-caps control was unintentionally activated, based on the location of the input and the surrounding context of the input. Aspects can then determine an intended input instead of "JTE." In this instance, the keyboard modes map nearly 1-to-1. Thus, keys that map to "JTE" on the correct (intended) keyboard mode can be selected and input instead. In this example, "JTE" keys on the all-caps keyboard mode 510 were determined to map to "$53" on the numeric keyboard 505 (e.g., as determined by keyboard location mapper 365). The determined intended input "$53" is then input instead of the unintended input "JTE."

The above example is merely exemplary, and any suitable keyboard modes, controls for toggling between keyboard modes, methods for determining unintentional activation of the controls, and methods for determining the intended input can be implemented without departing from the spirit and scope of the present disclosure.

Referring now to FIG. 6, shown is an example diagram depicting an unintentional input that occurred as a result of a user unintentionally not activating a control for keyboard switching, in accordance with embodiments of the present disclosure. As depicted in FIG. 6, a user may intend to input the phrase, "Please run PCR on the sample." In doing so, after finishing inputting the word "run," the user may have attempted to switch modes to an all-caps mode 610, shown above. However, upon attempting to begin inputting "PCR," the user unintentionally activated a numeric control switching the virtual keyboard to the numeric mode 605 and thereafter unintentionally did not activate the "ABC" control for toggling to the all-caps keyboard mode 610. As shown in FIG. 6, the user may have inputted an input on an intentional area 515 on the "ABC" all-caps control. As such, rather than inputting "Please run PCR on the sample," the user input "Please run 0,4 on the sample."

Aspects of the present disclosure can automatically correct this issue by analyzing the location of the input interaction on the "ABC" all-caps control. Based on the analysis (e.g., completed by input location analyzer 350), a determination can be made that an intentional area of the "ABC" all-caps control was activated (e.g., an area outside of the ABC control but in close proximity to the ABC control). Thereafter, the context of the surrounding inputs "Please run" and "on the sample" can be analyzed (e.g., by the input substance analyzer 355) with respect to the input that was input as a result of the unintentional control activation, "0,4." In this instance, a low semantic similarity can be computed between ("Please run" and "on the sample") and "0,4" (e.g., a semantic similarity or distance below a threshold). Thus, aspects can determine that the "ABC" all-caps control was unintentionally not activated, based on the location of the input and the surrounding context of the input. Aspects can then determine an intended input instead of "0,4." In this instance, the keyboard modes map nearly 1-to-1. Thus, keys that map to "0,4" on the correct (intended) keyboard mode can be selected and input instead. In this example, "0,4" keys on the numeric mode 605 were determined to map to "PCR" on the all-caps mode 610 (e.g., as determined by keyboard location mapper 365). The determined intended input "PCR" is then input instead of the unintended input "0,4."

The above example is merely exemplary, and any suitable keyboard modes, controls for toggling between keyboard modes, methods for determining unintentional inactivation of the controls, and methods for determining the intended input can be implemented without departing from the spirit and scope of the present disclosure.

Figure 7:
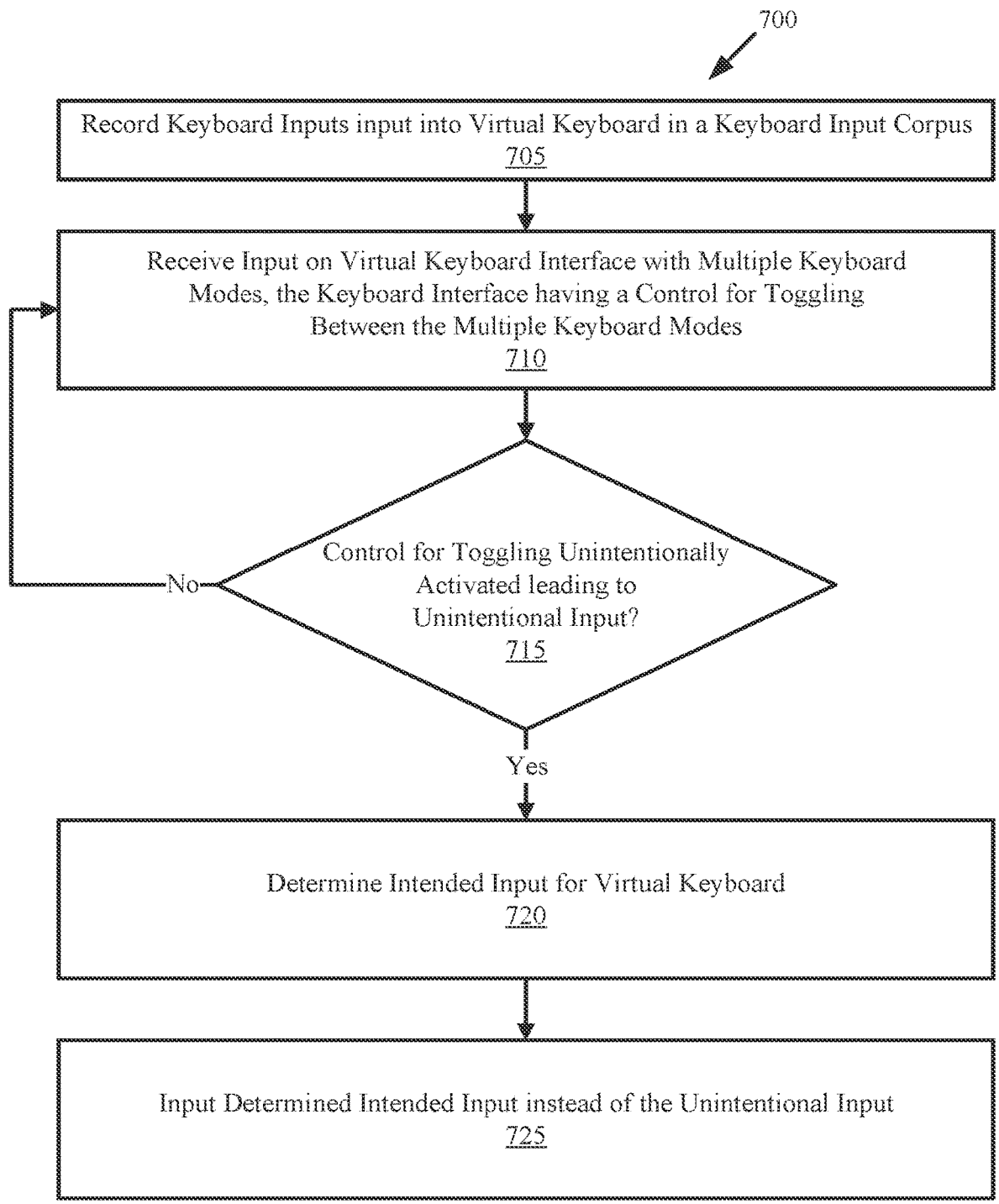
FIG. 7 is a flow-diagram illustrating an example method for correcting an unintended input as a result of unintentionally activating a control for toggling between keyboard modes, in accordance with embodiments of the present disclosure.

Referring now to FIG. 7, shown is a flow-diagram of an example method 700 for correcting an unintended input resulting from an unintentional activation of a control for toggling between keyboard modes, in accordance with embodiments of the present disclosure. One or more operations of method 700 can be completed by one or more processing circuits (e.g., computer 101, devices 205, server 235, user device 300).

Method 700 initiates at operation 705, where keyboard inputs submitted into a virtual keyboard are recorded in a keyboard input corpus. In embodiments, the keyboard input corpus can be the same as, or substantially similar to, keyboard input corpus 320 of FIG. 3. The keyboard input corpus can record historical keyboard inputs and historical corrections. This can aid in determining whether current inputs are unintentional and/or for determining intended inputs that should be submitted. The keyboard input corpus data can be used throughout operations 715-720.

An input on a virtual keyboard interface with multiple keyboard modes having one or more controls for toggling between the multiple keyboard modes is received. This is illustrated at operation 710. A determination is made whether a control for toggling between keyboard modes was unintentionally activated leading to an unintentional input. This is illustrated at operation 715. Determining whether the control for toggling between keyboard modes was unintentionally activated can be completed in the same, or a substantially similar manner, as discussed with respect to toggle control intent determiner 345 of FIG. 3. For example, determining whether the control for toggling between keyboard modes was unintentionally activated can include input location analysis and input substance analysis.

An intended input for the virtual keyboard is determined. This is illustrated at operation 720. Determining the intended input can be completed in the same, or a substantially similar manner, as described with respect to the intended input determiner 360 of FIG. 3. For example, keys on the unintentionally activated keyboard mode can be mapped to keys on the correct keyboard mode to determine the intended input. The intended input is then input instead of the unintentional input. This is illustrated at operation 725.

The aforementioned operations can be completed in any order and are not limited to those described. Additionally, some, all, or none of the aforementioned operations can be completed, while still remaining within the spirit and scope of the present disclosure.

Figure 8:
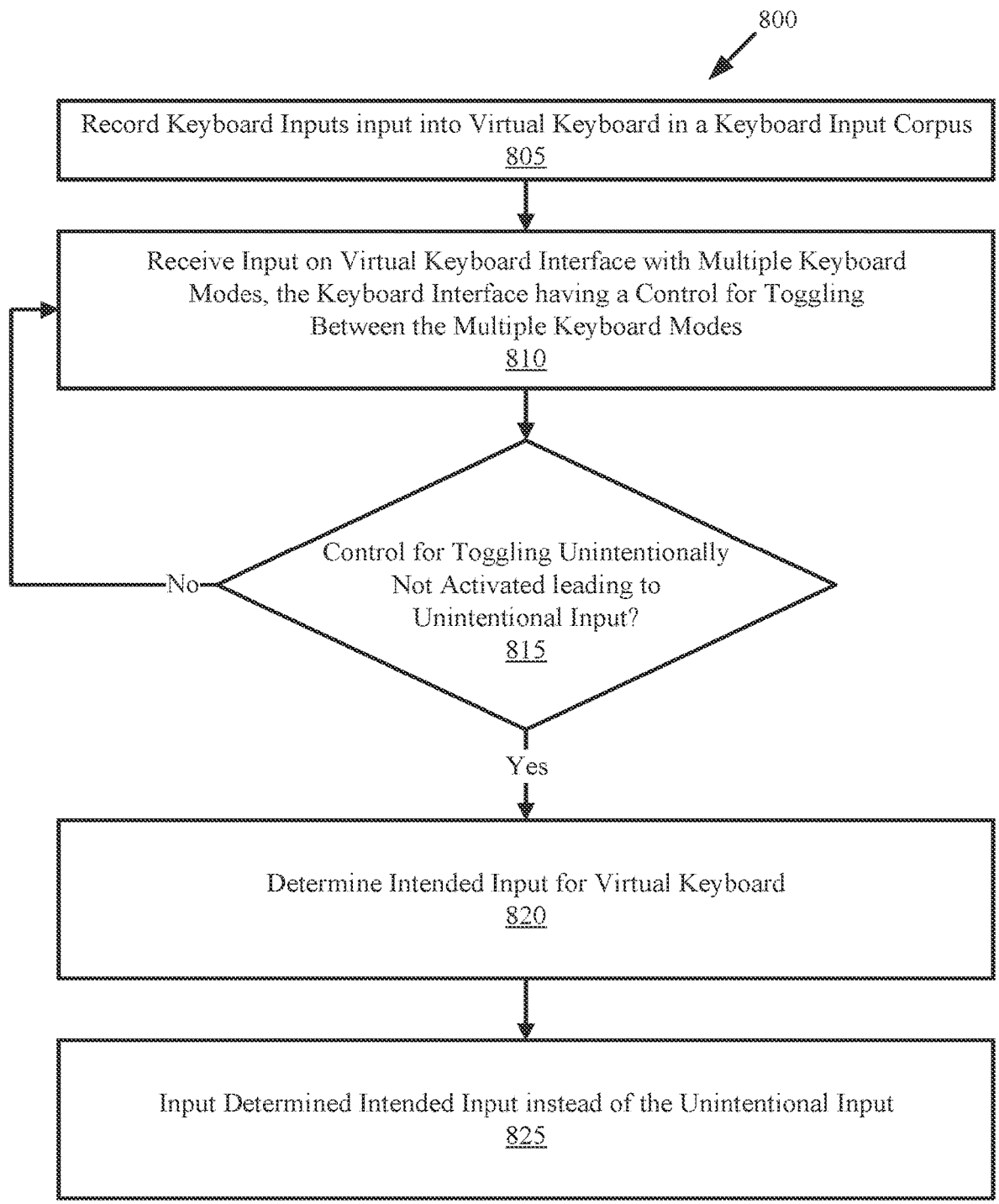
FIG. 8 is a flow-diagram illustrating an example method for correcting an unintended input as a result of unintentionally not activating a control for toggling between keyboard modes, in accordance with embodiments of the present disclosure.

Referring now to FIG. 8, shown is a flow-diagram of an example method 800 for correcting an unintended input resulting from an unintentional inactivation of a control for toggling between keyboard modes, in accordance with embodiments of the present disclosure. One or more operations of method 800 can be completed by one or more processing circuits (e.g., computer 101, devices 205, server 235, user device 300).

Method 800 initiates at operation 805, where keyboard inputs submitted into a virtual keyboard are recorded in a keyboard input corpus. In embodiments, the keyboard input corpus can be the same as, or substantially similar to, keyboard input corpus 320 of FIG. 3. The keyboard input corpus can record historical keyboard inputs and historical corrections. This can aid in determining whether current inputs are unintentional and/or for determining intended inputs that should be submitted. The keyboard input corpus data can be used throughout operations 815-820.

An input on a virtual keyboard interface with multiple keyboard modes having one or more controls for toggling between the multiple keyboard modes is received. This is illustrated at operation 810. A determination is made whether a control for toggling between keyboard modes was unintentionally not activated leading to an unintentional input. This is illustrated at operation 815. Determining whether the control for toggling between keyboard modes was unintentionally not activated can be completed in the same, or a substantially similar manner, as discussed with respect to toggle control intent determiner 345 of FIG. 3. For example, determining whether the control for toggling between keyboard modes was unintentionally not activated can include input location analysis and input substance analysis.

An intended input for the virtual keyboard is determined. This is illustrated at operation 820. Determining the intended input can be completed in the same, or a substantially similar manner, as described with respect to the intended input determiner 360 of FIG. 3. For example, keys on the unintentionally inactivated keyboard mode can be mapped to keys on the correct keyboard mode to determine the intended input. The intended input is then input instead of the unintentional input. This is illustrated at operation 825.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

Several examples will now be provided to further clarify various aspects of the present disclosure:

Example 1: A method comprising receiving, from a user, an input on a virtual keyboard with multiple keyboard modes, the virtual keyboard having one or more controls for toggling between the multiple keyboard modes, determining whether a control for toggling between the multiple keyboard modes was unintentionally activated by the user resulting in an unintentional input, determining, in response to determining that the control for toggling between the multiple keyboard modes was unintentionally activated by the user resulting in an unintentional input, an intended input, and inputting the determined intended input instead of the unintentional input.

Example 2: The limitations of Example 1, wherein determining that the control for toggling between the multiple keyboard modes was unintentionally activated includes determining an input location on the control and determining that the input location was received on an unintentional area of the control.

Example 3: The limitations of any of Examples 1-2, wherein determining that the control for toggling between the multiple keyboard modes was unintentionally activated includes analyzing input substance of inputs surrounding the unintentional input.

Example 4: The limitations of Example 3, wherein analyzing input substance includes computing a semantic similarity between inputs surrounding the unintentional input and the unintentional input.

Example 5: The limitations of any of Example 4, wherein the determination is made that the control for toggling between the multiple keyboard modes was unintentionally activated in response to the semantic similarity not satisfying a threshold.

Example 6: The limitations of any of Examples 3-5, wherein analyzing input substance of inputs surrounding the unintentional input is completed in response to determining an input location on the control and determining that the input location was received on an unintentional area of the control.

Example 7: The limitations of any of Examples 1-6, wherein the intended input is determined by mapping input locations of a first keyboard mode which the unintended input was submitted on as a result of the unintentional activation of the control to input locations of a second keyboard mode which was active before the unintentional activation of the control occurred.

Example 8: A system comprising one or more processor and one or more computer-readable storage media collectively storing program instructions which, when executed by the processor, are configured to cause the processor to perform a method comprising receiving, from a user, an input on a virtual keyboard with multiple keyboard modes, the virtual keyboard having one or more controls for toggling between the multiple keyboard modes, determining whether a control for toggling between the multiple keyboard modes was unintentionally not activated by the user resulting in an unintentional input, determining, in response to determining that the control for toggling between the multiple keyboard modes was unintentionally not activated by the user resulting in an unintentional input, an intended input, and inputting the determined intended input instead of the unintentional input.

Example 9: The limitations of Example 8, wherein determining that the control for toggling between the multiple keyboard modes was unintentionally not activated includes determining an input location nearby the control and determining that the input location was received on an intentional area outside of the control.

Example 10: The limitations of any of Examples 8-9, wherein determining that the control for toggling between the multiple keyboard modes was unintentionally not activated includes analyzing input substance of inputs surrounding the unintentional input.

Example 11: The limitations of Example 10, wherein analyzing input substance includes computing a semantic similarity between inputs surrounding the unintentional input and the unintentional input.

Example 12: The limitations of Example 11, wherein the determination is made that the control for toggling between the multiple keyboard modes was unintentionally not activated in response to the semantic similarity not satisfying a threshold.

Example 13: The limitations of any of Examples 10-12, wherein analyzing input substance of inputs surrounding the unintentional input is completed in response to determining an input location nearby the control, and determining that the input location was received on an intentional area outside of the control.

Example 14: The limitations of any of Examples 8-13, wherein the intended input is determined by mapping input locations of a first keyboard mode which the unintended input was submitted on as a result of the unintentional inactivation of the control to input locations of a second keyboard mode which was intended to be activated.

Example 15: A computer program product comprising one or more computer readable storage media, and program instructions collectively stored on the one or more computer readable storage media, the program instructions comprising instructions configured to cause one or more processors to perform a method according to any one of Examples 1-7.

What is claimed is:

1. A method comprising:
receiving, from a user, an input on a virtual keyboard with multiple keyboard modes, the virtual keyboard having one or more controls for toggling between the multiple keyboard modes;
determining whether a control of the one or more controls for toggling between the multiple keyboard modes was unintentionally activated by the user resulting in an unintentional input by analyzing input substance of inputs surrounding the unintentional input to determine whether the inputs surrounding the unintentional input are contextually consistent with the unintentional input;
determining, in response to determining that the control for toggling between the multiple keyboard modes was unintentionally activated by the user resulting in the unintentional input based on determining that the inputs surrounding the unintentional input are not contextually consistent with the unintentional input, an intended input to replace the unintentional input, wherein the intended input is determined by mapping a first key of a first keyboard mode having a first set of keys which the unintentional input was submitted on as a result of the unintentional activation of the control to a second key of a second keyboard mode having a second set of keys which was activated before the unintentional activation of the control occurred; and
inputting the determined intended input instead of the unintentional input.

2. The method of claim 1, wherein determining that the control for toggling between the multiple keyboard modes was unintentionally activated includes determining an input location on the control and determining that the input location was received on an unintentional area of the control, the unintentional area of the control being an area on the control for toggling between the multiple keyboard modes designating any inputs received within the area as unintentional inputs.

3. The method of claim 1, wherein determining that the control for toggling between the multiple keyboard modes was unintentionally activated includes computing a semantic similarity between inputs surrounding the unintentional input and the unintentional input and determining that the control for toggling between the multiple keyboard modes was unintentionally activated based on the computed semantic similarity.

4. The method of claim 3, wherein the determination is made that the control for toggling between the multiple keyboard modes was unintentionally activated in response to the computed semantic similarity not satisfying a semantic similarity threshold.

5. The method of claim 1, wherein analyzing input substance of inputs surrounding the unintentional input is completed in response to:
 determining an input location on the control; and
 determining that the input location was received on an unintentional area of the control.

6. The method of claim 1, wherein determining that the control for toggling between the multiple keyboard modes was unintentionally activated includes:
 computing a first semantic similarity between inputs surrounding the unintentional input and the unintentional input;
 computing a second semantic similarity between inputs surrounding the unintentional input and the determined intended input; and
 determining that the control for toggling between the multiple keyboard modes was unintentionally activated based on the second semantic similarity being greater than the first semantic similarity.

7. A system comprising:
 one or more processors; and
 one or more computer-readable storage media collectively storing program instructions which, when executed by the one or more processors, are configured to cause the one or more processors to perform a method comprising:
 receiving, from a user, an input on a virtual keyboard with multiple keyboard modes, the virtual keyboard having one or more controls for toggling between the multiple keyboard modes;
 determining whether a control of the one or more controls for toggling between the multiple keyboard modes was unintentionally not activated by the user resulting in an unintentional input by analyzing input substance of inputs surrounding the unintentional input to determine whether the inputs surrounding the unintentional input are contextually consistent with the unintentional input;
 determining, in response to determining that the control for toggling between the multiple keyboard modes was unintentionally not activated by the user resulting in the unintentional input based on determining that the inputs surrounding the unintentional input are not contextually consistent with the unintentional input, an intended input, wherein the intended input is determined by mapping a first key of a first keyboard mode having a first set of keys which the unintentional input was submitted on as a result of the unintentional inactivation of the control to a second key of a second keyboard mode having a second set of keys which was intended to be activated; and
 inputting the determined intended input instead of the unintentional input.

8. The system of claim 7, wherein determining that the control for toggling between the multiple keyboard modes was unintentionally not activated includes determining an input location nearby the control and determining that the input location was received on an intentional area outside of the control, the intentional area being an area outside of the control for toggling between the multiple keyboard modes designating any inputs received within the area as intentional inputs.

9. The system of claim 7, wherein determining that the control for toggling between the multiple keyboard modes was unintentionally not activated includes computing a semantic similarity between inputs surrounding the unintentional input and the unintentional input and determining that the control for toggling between the multiple keyboard modes was unintentionally not activated based on the computed semantic similarity.

10. The system of claim 9, wherein the determination is made that the control for toggling between the multiple keyboard modes was unintentionally not activated in response to the computed semantic similarity not satisfying a semantic similarity threshold.

11. The method of claim 7, wherein analyzing input substance of inputs surrounding the unintentional input is completed in response to:
 determining an input location nearby the control; and
 determining that the input location was received on an unintentional area of the control.

12. The system of claim 7, wherein determining that the control for toggling between the multiple keyboard modes was unintentionally not activated includes:
 computing a first semantic similarity between inputs surrounding the unintentional input and the unintentional input;
 computing a second semantic similarity between inputs surrounding the unintentional input and the determined intended input; and
 determining that the control for toggling between the multiple keyboard modes was unintentionally not activated based on the second semantic similarity being greater than the first semantic similarity.

13. A computer program product comprising one or more computer readable storage media, and program instructions collectively stored on the one or more computer readable storage media, the program instructions comprising instructions configured to cause one or more processors to perform a method comprising:
 receiving, from a user, an input on a virtual keyboard with multiple keyboard modes, the virtual keyboard having one or more controls for toggling between the multiple keyboard modes;
 determining whether a control of the one or more controls for toggling between the multiple keyboard modes was unintentionally activated by the user resulting in an unintentional input by analyzing input substance of inputs surrounding the unintentional input to determine whether the inputs surrounding the unintentional input are contextually consistent with the unintentional input;
 determining, in response to determining that the control for toggling between the multiple keyboard modes was unintentionally activated by the user resulting in the unintentional input based on determining that the inputs surrounding the unintentional input are not contextually consistent with the unintentional input, an intended input to replace the unintentional input, wherein the intended input is determined by mapping a first key of a first keyboard mode having a first set of keys which the unintentional input was submitted on as a result of the unintentional activation of the control to a second key of a second keyboard mode having a second set of keys which was activated before the unintentional activation of the control occurred; and
inputting the determined intended input instead of the unintentional input.

14. The computer program product of claim 13, wherein determining that the control for toggling between the multiple keyboard modes was unintentionally activated includes determining an input location on the control and determining that the input location was received on an unintentional area of the control, the unintentional area of the control being an area on the control for toggling between the multiple keyboard modes designating any inputs received within the area as unintentional inputs.

15. The computer program product of claim 13, wherein determining that the control for toggling between the multiple keyboard modes was unintentionally activated includes computing a semantic similarity between inputs surrounding the unintentional input and the unintentional input and determining that the control for toggling between the multiple keyboard modes was unintentionally activated based on the computed semantic similarity.

16. The computer program product of claim 15, wherein the determination is made that the control for toggling between the multiple keyboard modes was unintentionally activated in response to the computed semantic similarity not satisfying a semantic similarity threshold.

* * * * *